United States Patent
Sonwane (10) Patent No.: US 11,240,328 B1
(45) Date of Patent: Feb. 1, 2022

(54) PRIVACY ENHANCED APPLICATION USAGE MONITORING

(71) Applicant: SAP SE, Walldorf (DE)

(72) Inventor: Tejram Jagannath Sonwane, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/108,630

(22) Filed: Dec. 1, 2020

(51) Int. Cl.
*H04L 29/08* (2006.01)

(52) U.S. Cl.
CPC ............ *H04L 67/22* (2013.01); *H04L 67/306* (2013.01)

(58) Field of Classification Search
CPC .............................. H04L 67/22; H04L 67/306
See application file for complete search history.

(56) References Cited

U.S. PATENT DOCUMENTS

| | | | | |
|---|---|---|---|---|
| 10,101,984 B1* | 10/2018 | Keen | .................... | G06F 8/61 |
| 2001/0054026 A1* | 12/2001 | Choate | ................ | G06F 11/3409 705/52 |
| 2008/0177750 A1* | 7/2008 | Ricker | .................... | G06F 16/29 |
| 2012/0137283 A1* | 5/2012 | Antill | ........................ | G06F 8/60 717/178 |
| 2014/0095692 A1* | 4/2014 | Anderson | ........... | G06F 11/3093 709/224 |
| 2015/0026289 A1* | 1/2015 | Nordness | ................ | H04L 67/06 709/213 |
| 2015/0339664 A1* | 11/2015 | Wong | ................... | H04W 12/069 705/71 |
| 2016/0078059 A1* | 3/2016 | Kang | ............... | H04N 21/23418 382/305 |
| 2017/0289283 A1* | 10/2017 | Ungerer | ................ | G06F 16/951 |
| 2019/0347181 A1* | 11/2019 | Cranfill | ................... | G06F 9/541 |
| 2020/0047865 A1* | 2/2020 | Alsina | .................... | B63H 20/02 |
| 2021/0152648 A1* | 5/2021 | Matejka | .............. | G06F 11/3438 |

* cited by examiner

*Primary Examiner* — Oanh Duong
(74) *Attorney, Agent, or Firm* — Klarquist Sparkman, LLP (57) ABSTRACT

Systems, methods, and computer media for monitoring software application usage are provided herein. Using a local, time-interval-based approach, valuable information can be obtained for application providers without collecting or exposing user's personal data. Application usage data for a user is recorded and stored locally, on a client device, in conjunction with time intervals of different duration. After new application usage is recorded, it can be determined, based on comparison with the stored application usage data, if an application usage update is needed. The update can be generated by and sent from the client device to a remote application management system, and the remote system can perform analytics and improve the application as a result.

17 Claims, 6 Drawing Sheets

PRIVACY ENHANCED APPLICATION USAGE MONITORING

BACKGROUND

As personal data and Internet history are increasingly being gathered and used for various purposes, privacy concerns have also grown. Several jurisdictions, including Europe and China, have passed laws and taken other measures to limit access to personal data to protect privacy. Such protections, however, can limit the access of software application providers and others to useful data.

DETAILED DESCRIPTION

The examples described herein generally monitor application usage without exposing or relying on private user data. Conventionally, software application providers collect data regarding application usage that is associated with a unique user identifier (UUID) such as a mobile device or computer identifier, username, etc. Software application providers can then perform analytics based on the UUID. Because of recent increases in privacy requirements and general concern over data protection, however, UUIDs frequently cannot be captured without user consent if at all.

The examples described herein monitor application usage without exposing private user data. Application usage data for a user is recorded and stored locally, on a client device, in a time-based manner. Application usage updates can be sent from the client device to a remote application management system, and the remote system can perform analytics and improve the application as a result. The updates can indicate application usage corresponding to different time intervals (e.g., usage for a current day, a current week, a current month, etc.) and can also indicate a user type (e.g., a new, active, or returning user). Such updates provide meaningful usage information to an application provider without revealing the user's UUID. Because the UUID is not transmitted in the application usage update and the logic determining what updates to send when is performed on the client side, privacy is ensured.

As a specific example, a usage tracking data store can be maintained on a client device (e.g., mobile device, laptop, desktop computer, etc.) of a user. The usage tracking data store can track application usage for the current day, the current week, current month, current quarter, current year, etc. Application usage updates can be sent when data for one of these time intervals changes.

For example, if an application login (or other usage activity) is recorded for a current day, the usage tracking data store can be checked to see if a login has already occurred on the current day, in the current week, in the current month, etc. If, for example, a login has been recorded for the current month and year but not for the current week or current day, then an application usage update can be generated indicating usage for the current week and current day. Because application usage updates have already been sent for data stored in the usage tracking data store, usage for the current month and year is already known to the application management system. Therefore, monthly and yearly usage information is not included in the application usage update.

Application usage can also be classified as, for example, new user, active user, and returning user. A user can be classified as active if recent activity (e.g., in the last day, two days, week, etc.) is stored in the data store. If a longer period has elapsed between prior application usage and the current usage (e.g., ten days, a month, a year, etc.), the user can be classified as a returning user. If the usage tracking data store does not have any records for the user, the user can be classified as a new user.

Returning to the example above, the application usage update can include the classification of the user as either active or returning and indicate activity for the current day and current week. This information can be used by the application management system to determine how frequently users access an application, which features are accessed at what frequency, and other information that is useful in updating the application to add/remove features, improve access to features, etc.

As another example, when a user accesses the application for the first time, the usage tracking data store has no information because there has been no previous usage. In such a case, the application usage update generated can include a classification of new user along with usage updates for each of the tracked time intervals.

Examples are described below with reference to FIGS. 1-6.

Figure 1:
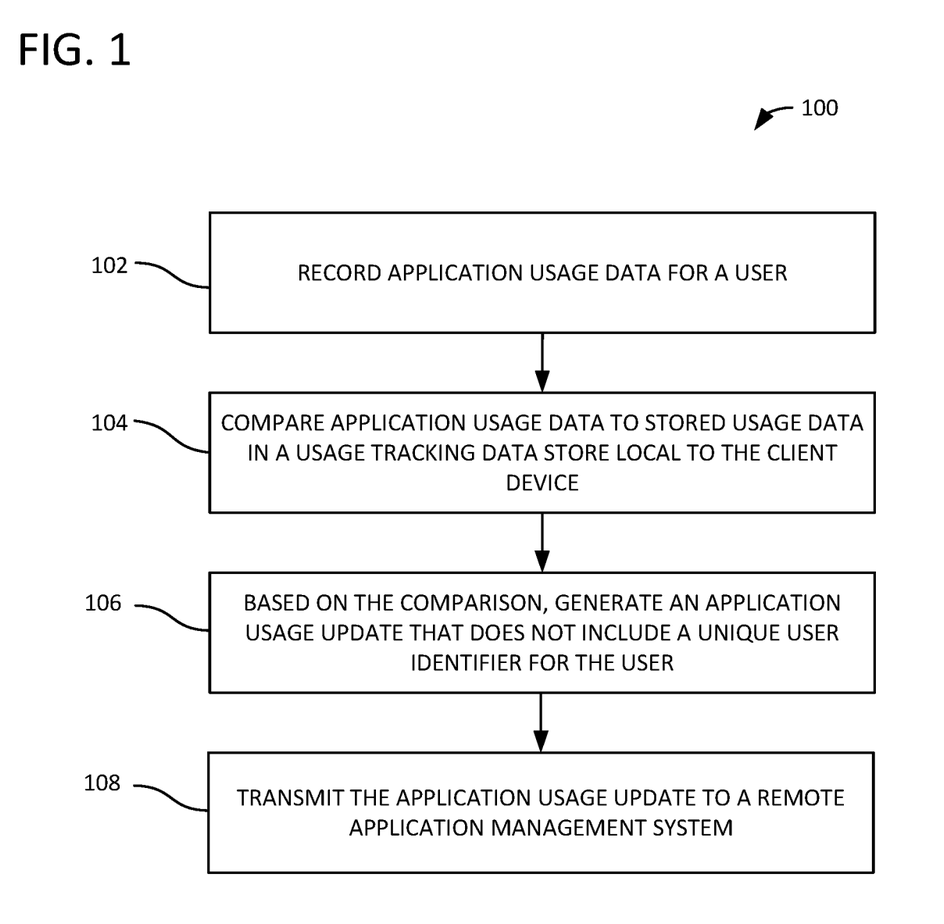
FIG. 1 illustrates an example client-side method of monitoring application usage.

FIG. 1 illustrates a method 100 for monitoring application usage. Method 100 is performed at a client device, such as a mobile device or laptop or desktop computer, associated with a user of an application. In process block 102, application usage data is recorded for a user. Application usage data can include a user login, a user interaction with a menu or feature, or a combination of user actions (e.g., applying a filter and saving the result). Application usage data can be or include a timestamp for the usage, such as "09/17/20 5:17:39 AM." In some examples, multiple types of application usage are monitored, such as both logins and interaction with a particular feature or functionality.

In process block 104, the application usage data is compared to stored usage data in a usage tracking data store local to the client device (e.g., in a mobile device or computer memory or hard drive). The usage tracking data store can be configured to store usage data for different time intervals (e.g., for a current hour, a current day, a current week, etc.). The usage tracking data store can store a timestamp for the first application usage that occurs during each time interval. As an example, for a current day of Sep. 17, 2020, a timestamp on Jan. 3, 2020 could reflect the first application usage of the current year, a timestamp of Sep. 1, 2020 could reflect the first application usage of the current month, etc. For examples in which multiple types of application activity are tracked, the usage tracking data store can be configured to store usage data for the different time intervals for the multiple types of application activity. Examples of usage tracking data stores are shown in Tables 1 and 2 discussed with reference to FIG. 4.

The comparison can include determining if the stored usage data includes application usage data for the user from a plurality of different time intervals. Each of the different time intervals can be checked to see if there is stored usage data. If no stored usage data is found, then the time of the newly recorded data usage can be stored. For intervals where stored application usage data is found, the comparison can include comparing a time unit of the stored usage data to a time unit of the recorded data. For example, if current month usage data is stored, but the stored data is old and has a date from the previous month, the recorded application usage data is determined to be new, and storage can be updated to add the date of the newly recorded application usage data as data for the current month. If the stored usage data is from an earlier date in the current month, however, then the stored data is current, and no change is made.

In process block 106, based on the comparing, an application usage update is generated. The application usage update does not include a UUID for the user. Instead, the application usage update includes other information to ensure that the data is useful to a software application provider. The update includes new usage data, along with the corresponding time interval, and can also include a classification such as active user, returning user, or new user.

For example, if only current day usage data is determined to have changed based on the comparison with the usage tracking data store, and the user is determined to be an active user (e.g., the last usage data is from the day before), then the generated update can include this information, in, for example, the following format: "Active User, DAY, 09/17/20 5:17:39 AM." This informs the remote management system that there is new application usage for the current day, for an active user, and provides the timestamp. The system already knows about the stored usage information for the current week, current month, etc., so this information is not included in the usage update. In some examples, the application usage update includes a description of the usage being tracked, such as "login," "filter," or "stacked bar chart visualization." Application usage updates can be generated after the usage occurs (e.g., after login for login tracking), periodically, or upon logout.

In process block 108, the application usage update is transmitted to a remote application management system. The remote application management system can be on one or more servers that implement a server-side portion of the application (e.g., in a mobile application context). Application usage updates, received over time, provide software application providers with an understanding of what features are used and how frequently, how frequently users login or logout, etc. This information can be used to make decisions about features to update, omit, improve, etc. for the application. As an example, if a large number of users access a particular functionality each time they log in, that functionality can be made more visible or easier to access (e.g., moved from a multi-level menu to a direct access toolbar). Similarly, if certain functionality is almost never accessed, the functionality can be removed or relocated out of a main menu.

Figure 2:
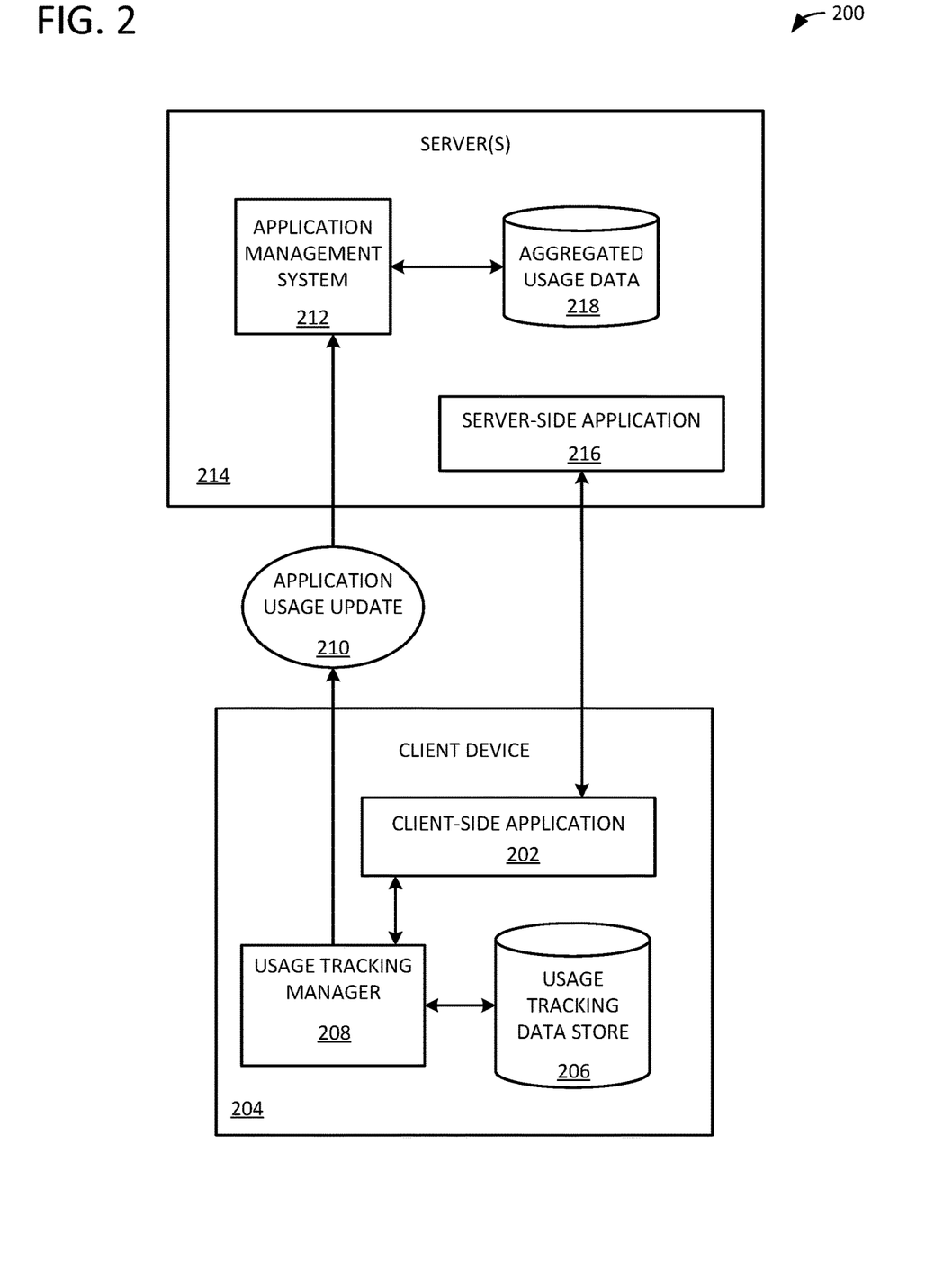
FIG. 2 is an example application usage monitoring system.

FIG. 2 illustrates an application usage monitoring system 200. Client-side application 202 is installed on client device 204, which can be a mobile device, laptop or desktop computer, or other device. Usage tracking data store 206 is configured to store application usage data for the user for different time intervals. For example, usage tracking data store 206 can store usage data (such as a timestamp) for one or more of current day, current week, current month, current quarter, current year, current fiscal year, etc. In some examples, only one time interval is of interest (e.g., current day or current month), and only that time interval is tracked.

Usage tracking manager 208 records new application usage data, compares the new application usage data to what is stored in usage tracking data store 206, and generates application usage update(s) 210. Application usage update (s) 210 is transmitted to application management system 212 on server(s) 214. Server-side application 216 (for example, in the case of mobile applications), can be implemented on server(s) 214 or other servers. Application management system 212 stores received application updates in aggregated usage data store 218. The data in aggregated usage data store 218 can be used to identify trends and usage patterns and make changes to the application.

Figure 3:
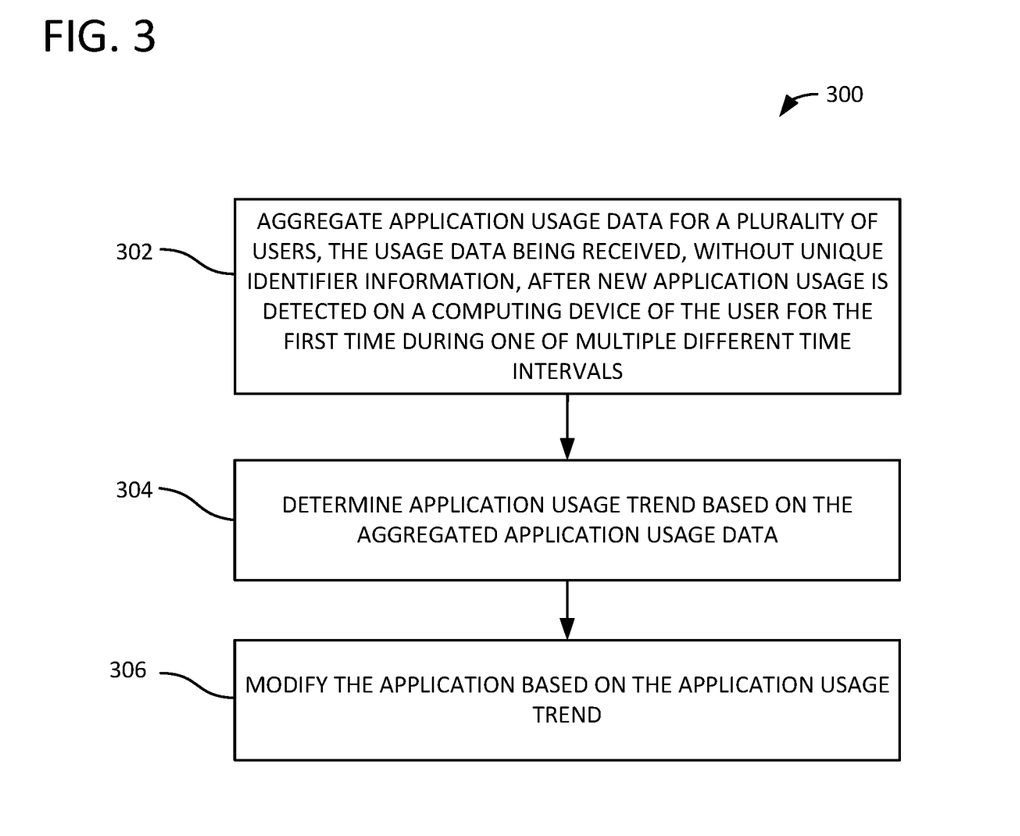
FIG. 3 illustrates an example method of modifying an application based on application usage data.

FIG. 3 illustrates a method 300 of modifying an application based on application usage data. In process block 302, application usage data for a plurality of users is aggregated. The application usage data for the respective users is received, without unique user identification information, from computing devices associated with the users after new application usage is detected on one of the computing devices for a first time during one of multiple different time intervals. The application usage data for the plurality of users is aggregated by time interval, which allows trends to be determined on a daily, weekly, monthly, quarterly, etc. basis. Application usage data can also be aggregated by what is being tracked, such as logins or feature interactions. Generation of application usage data updates, which provide the data aggregated in process block 302, is discussed in detail with respect to FIGS. 1, 2, 4, 5, and 6.

In process block 304, an application usage trend is determined based on the aggregated application usage data. Application usage trends can be determined by comparing the relative usage of different features, increases or decreases in usage over time, correlation of usage with introduction or removal of features or application redesigns, etc. Various statistical and machine learning techniques can be used to determine trends, including trained neural networks, state vector machines (SVMs), decision trees, and other approaches.

In process block 306, the application is modified based on the application usage trend. The application can be modified through an update, patch, new version or other approach. The modification of the application can be done to address the identified trends. For example, if a significant number of users are accessing a particular feature, the feature can be relocated to make it more prominent or easier to access (e.g., move to a main menu, home screen, toolbar, or other convenient location). Usage data indicating usage of a certain type of feature (e.g., filters) can be used as motivation to add more similar features (additional filters). Features can also be removed based on lack of usage data. Overall declining usage, such as a reduction in logins, can be interpreted as an overall dissatisfaction with the application and can be used as motivation for a redesign or incorporation of new features.

Figure 4:
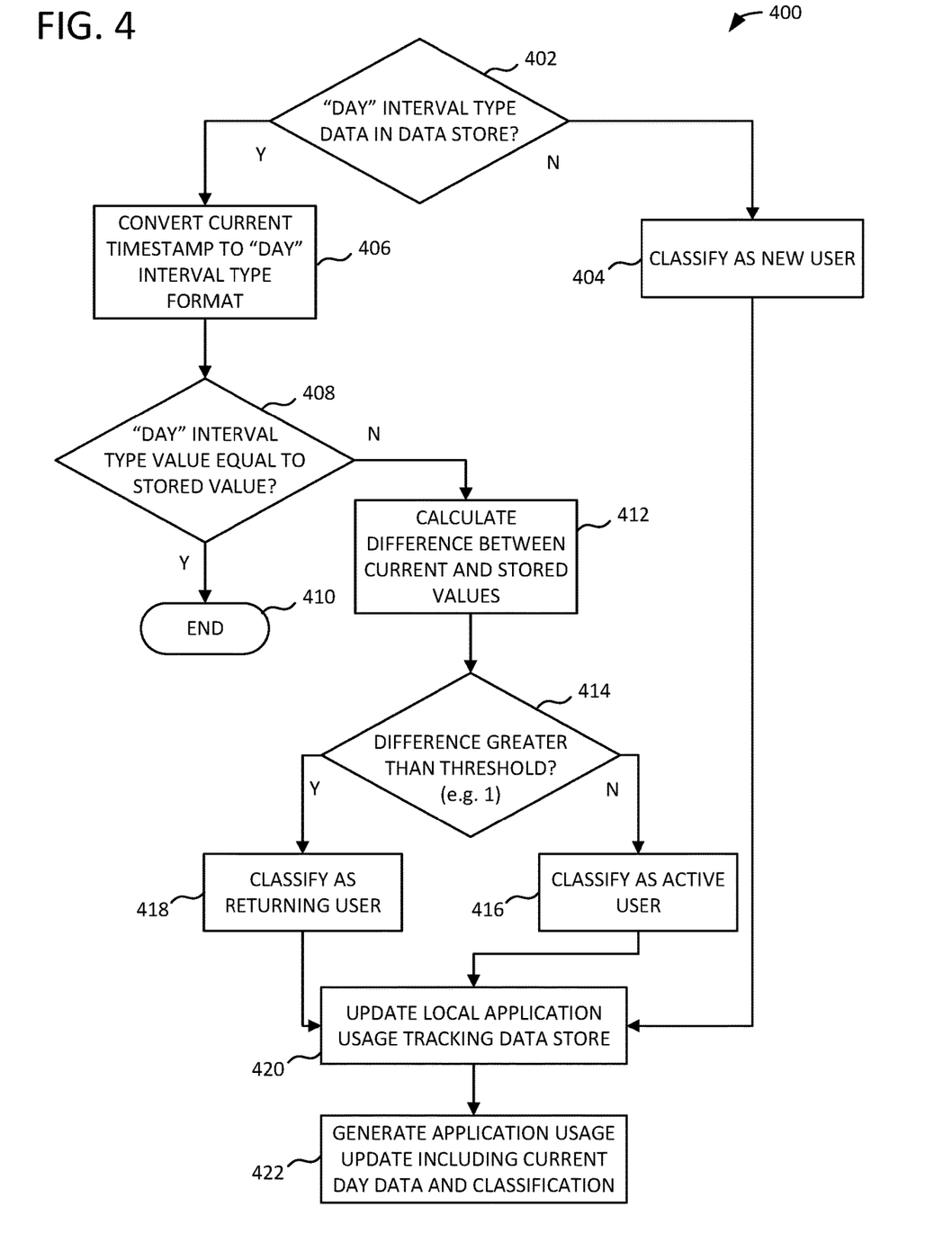
FIG. 4 is a flow chart showing an example comparison between recorded usage data for a user and stored usage data for a time interval.

FIG. 4 illustrates a flow chart 400 showing an example comparison between new and stored usage data for a user and for a time interval. Various formats can be used to store application usage data in the usage tracking data store. Table 1, below, shows an example format.

TABLE 1

Example Usage Tracking Data Store Format - New User

| User Type | Time Interval Type | Time Interval Value | Interval Integer | Timestamp |
|---|---|---|---|---|
| Active User | DAY | D261-2020 | 261 | 09/17/20 5:17:39 AM |
| Active User | WEEK | W38-2020 | 38 | 09/17/20 5:17:39 AM |
| Active User | MONTH | M09-2020 | 9 | 09/17/20 5:17:39 AM |
| Active User | QUARTER | Q3-2020 | 3 | 09/17/20 5:17:39 AM |
| Active User | YEAR | 2020 | 2020 | 09/17/20 5:17:39 AM |

Table 1 shows an example of how a usage tracking data store is populated the first time a user logs in. Table 1 includes intervals of current day (DAY), current week (WEEK), current month (MONTH), current quarter (QUARTER) and current year (YEAR). The user logs in at 5:17:39 AM on Sep. 17, 2020, and because the data store was empty prior to the user's first login, the timestamp for the login is added for each of the time intervals. Now that the user has logged in, they become an active user, as indicated in the user type. The resulting application usage update, however, will indicate the user as "new user." For calculation purposes, the timestamp of the recorded usage is converted to a "time interval value" corresponding to the time interval. For DAY, September 17 is day 261 starting with January 1 as the baseline, so the time interval value is "D261-2020." The corresponding interval integer (used for calculations) is 261. The numeric value of a day, month, quarter, etc., can be determined using existing operating system functions or other approaches.

Consider, for example, the user logging into the application for a second time the following week. Each of the interval integers for the time intervals are compared with interval integers based on a new timestamp to determine if new usage data is present. For a timestamp of the second user login of 09/25/20 8:00:00 AM, the corresponding DAY interval integer is 269, WEEK interval integer is 39, MONTH interval integer is 9, QUARTER interval integer is 3, and YEAR interval integer is 2020. These values are compared to the values in Table 1. The values for MONTH, QUARTER, and YEAR are the same as before, so no change is needed. The DAY and WEEK interval integers have changed, however (from 261 and 38 to 269 and 39, corresponding to a timestamp eight days later). Table 2, below, shows how Table 1 is modified to incorporate this information.

TABLE 2

Modified Usage Tracking Data Store after Second Login

| User Type | Time Interval Type | Time Interval Value | Interval Integer | Timestamp |
|---|---|---|---|---|
| Active User | DAY | D261-2020 | 269 | 09/25/20 8:00:00 AM |
| Active User | WEEK | W38-2020 | 39 | 09/25/20 8:00:00 AM |
| Active User | MONTH | M09-2020 | 9 | 09/17/20 5:17:39 AM |
| Active User | QUARTER | Q3-2020 | 3 | 09/17/20 5:17:39 AM |
| Active User | YEAR | 2020 | 2020 | 09/17/20 5:17:39 AM |

The new application usage data for DAY and WEEK are also provided to the application management system in an application usage update. The update does not include information for MONTH, QUARTER, and YEAR, because the stored values are still current (i.e., it is still September, Q3, 2020). Through this approach, whenever the storage is updated, an application usage update is also generated and transmitted.

The update also includes "active user" or "returning user" as the user type instead of "new user" as in the previous example. A threshold can be set between active and returning user. An active user is a user for whom usage data is generated more frequently (such as daily or weekly), and a returning user is a user for whom usage data is generated less frequently (such as weekly or monthly). The threshold for distinguishing between the two can be set to, for example, one day, two days, one week, ten days, etc. For a threshold of two days with the above examples, subtracting the stored interval integer value of 261 from the new interval integer value of 269 equals eight, which is greater than two, so the user is categorized as a returning user in the application usage update.

Method 400 is a flow chart for handling DAY interval type usage data when new usage data is recorded. In decision box 402, it is determined if any DAY interval type data is in the usage tracking data store. If not, then the user is classified as a new user in process block 404. If there is DAY interval type data stored, then a timestamp of the new usage data is converted to the DAY interval type interval value (e.g., with a format of D ###-YEAR) and the corresponding interval integer (three digits for DAY) in process block 406.

In decision box 408, it is determined if the DAY interval type value of the new usage data and the stored data are equal. If yes, then method 400 ends in process block 410. Having the same value indicates that the day is the same, and there is no need to update usage data for the current day. If the values are not equal, then in process block 412, the difference between the new and stored values is calculated. This can be done, for example, by subtracting the interval integers. In some examples, the year portion of the time interval value is compared to ensure the year is the same.

In process block 414, the difference is compared to a threshold that distinguishes between returning and active users. If the difference is less than the threshold, the user is classified as an active user in process block 416. If the difference is greater than the threshold, the user is classified as a returning user in process block 418. The local application usage tracking data store is updated to reflect the new usage data for DAY in process block 420. In process block 422, an application usage update is generated including the new usage data for DAY and the classification of either returning user, active user, or new user.

Method 400 can be repeated for the other time interval types (e.g., WEEK, MONTH, QUARTER, YEAR). In some examples, the application usage update is not generated until each time interval type is evaluated to determine if the new usage data requires an update for the time interval type.

Figure 5:
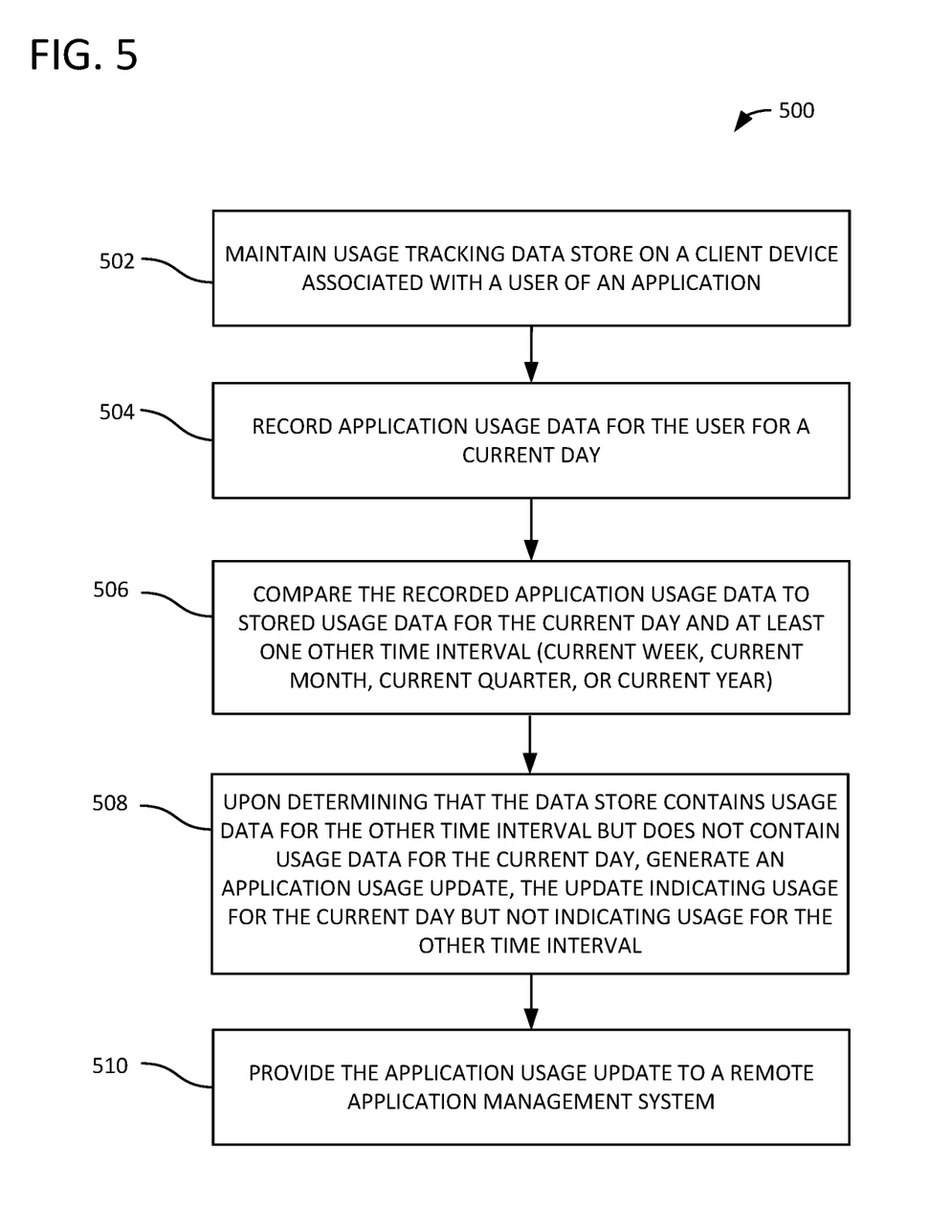
FIG. 5 illustrates an example method of monitoring application usage in which recorded usage data is compared to stored data for the current day and at least one other time interval.

FIG. 5 illustrates a method 500 of monitoring application usage. In process block 502, a usage tracking data store is maintained on a client device associated with a user of an application. The usage tracking data store is configured to record application usage for the user during time intervals of different duration. Example usage tracking data stores are illustrated in Tables 1 and 2. In process block 504, application usage data is recorded for the user for a current day. The usage data can reflect a login, logout, or interaction with functionality or data in the application.

In process block 506, the recorded application usage data is compared to stored usage data in the usage tracking data store for the current day and at least one other time interval, where the other time interval is one of a current week, a current month, a current quarter, or a current year. In process block 508, upon determining that the usage tracking data store contains usage data for the other time interval (e.g., WEEK) but does not contain usage data for the current day (DAY data that falls in the current day), generating an application usage update, the application usage update indicating usage for the current day but not indicating usage for the other time interval for which the usage tracking data store contains usage data. The application usage update does not contain a unique user identifier for the user. In process block 510, the application usage update is provided to a remote application management system.

Example Computing Systems

Figure 6:
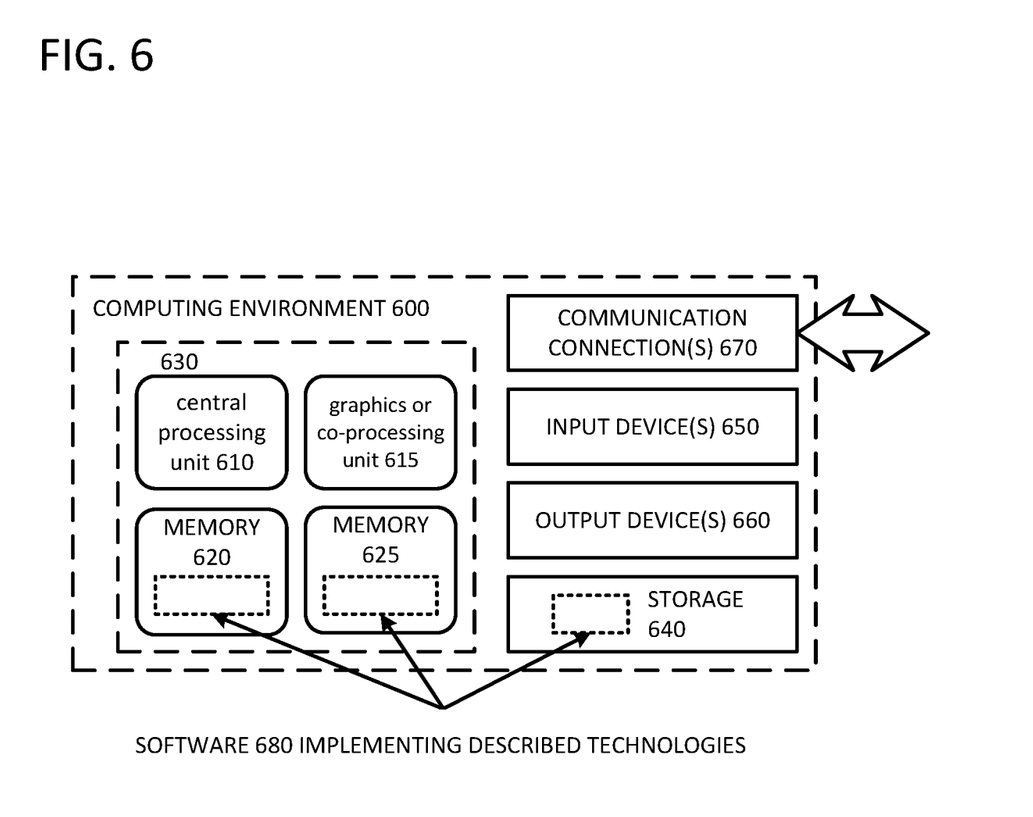
FIG. 6 is a diagram illustrating a generalized implementation environment in which some described examples can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s). For example, memory 620 and 625 can store usage tracking manager 208 or usage tracking data store 206 of FIG. 2.

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more innovations described herein. For example, storage 640 can store usage tracking manager 208 or usage tracking data store 206 of FIG. 2.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections (e.g., 670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

I claim:

1. A method, comprising:
   at a client device associated with a user of an application:
   recording application usage data for the user on a current day in a current month;
   comparing the application usage data to stored usage data in a usage tracking data store local to the client device, wherein the comparing comprises determining if the stored usage data includes application usage data for the user from a plurality of different time intervals, the plurality of different time intervals including the current day;
   upon determining that the stored usage data does not include application usage data for the user for the current day:
      generating an application usage update indicating usage for the current day, wherein the application usage update does not include a unique user identifier for the user, and
      updating the stored usage data to reflect the recorded application usage data; and
   transmitting the application usage update to a remote application management system.

2. The method of claim 1, wherein the plurality of different time intervals also include one or more of a current week, a current month, a current quarter, or a current year.

3. The method of claim 1, further comprising, upon determining that the stored usage data does not include application usage data for the user for one of the plurality of different time intervals other than the current day, including application usage data for the time interval in the generated application usage update.

4. The method of claim 1, wherein the comparing comprises comparing a time unit of the application usage data to a time unit of the stored usage data.

5. The method of claim 1, further comprising, upon determining that the stored usage data does include application usage data for the user during one of the plurality of different time intervals, omitting application usage data for the time interval in the generated application usage update.

6. The method of claim 1, further comprising, upon determining that the stored usage data does not include application usage data for the user for the current month:
   including application usage data for the current month in the generated application usage update, and
   updating the stored usage data to reflect the recorded application usage data.

7. The method of claim 1, wherein the plurality of different time intervals includes the current month, and wherein the method further comprises upon determining that the stored usage data does include application usage data for the user for the current month, omitting monthly application usage data from the generated application usage update.

8. The method of claim 1, wherein the client device is a mobile device, and wherein the usage tracking data store is in local storage of the mobile device.

9. The method of claim 1, wherein the application usage data for the user reflects a user login to the application or a user interaction with application functionality.

10. One or more computer-readable storage media storing computer-executable instructions for monitoring application usage, the monitoring comprising:
   maintaining a usage tracking data store on a client device associated with a user of an application, the usage tracking data store configured to record application usage for the user during time intervals of different duration;
   recording application usage data for the user for a current day;
   comparing the recorded application usage data to stored usage data in the usage tracking data store for the current day and at least one other time interval, where the other time interval is one of a current week, a current month, a current quarter, or a current year;
   upon determining that the usage tracking data store contains usage data for the other time interval but does not contain usage data for the current day, generating an application usage update, the application usage update indicating usage for the current day but not indicating usage for the other time interval for which the usage tracking data store contains usage data, wherein the application usage update does not contain a unique user identifier for the user; and providing the application usage update to a remote application management system.

11. The computer-readable storage media of claim 10, wherein when the usage tracking data store contains usage data for a previous day less than a threshold number of days before the current day, an active user classification is included in the application usage update, and wherein when the usage tracking data store contains usage data for a previous day greater than a threshold number of days before the current day, a returning user classification is included in the application usage update.

12. The computer-readable storage media of claim 10, wherein the monitoring further comprises updating the usage tracking data store with a timestamp of the recorded application usage data for the user.

13. The computer-readable storage media of claim 10, wherein the monitoring further comprises after the user logs in to the application for the first time from the client device, transmitting an application usage update indicating a new user classification and including usage data for all of the time intervals of different duration.

14. A method of monitoring application usage, the method comprising:

maintaining a usage tracking data store on a client device associated with a user of an application, the usage tracking data store configured to record application usage for the user during time intervals of different duration;

recording application usage data for the user for a current day;

comparing the recorded application usage data to stored usage data in the usage tracking data store for the current day and at least one other time interval, where the other time interval is one of a current week, a current month, a current quarter, or a current year;

upon determining that the usage tracking data store contains usage data for the other time interval but does not contain usage data for the current day, generating an application usage update, the application usage update indicating usage for the current day but not indicating usage for the other time interval for which the usage tracking data store contains usage data, wherein the application usage update does not contain a unique user identifier for the user; and providing the application usage update to a remote application management system.

15. The method of claim 14, wherein when the usage tracking data store contains usage data for a previous day less than a threshold number of days before the current day, an active user classification is included in the application usage update, and wherein when the usage tracking data store contains usage data for a previous day greater than a threshold number of days before the current day, a returning user classification is included in the application usage update.

16. The method of claim 14, further comprising updating the usage tracking data store with a timestamp of the recorded application usage data for the user.

17. The method of claim 14, further comprising after the user logs in to the application for the first time from the client device, transmitting an application usage update indicating a new user classification and including usage data for all of the time intervals of different duration.

* * * * *